(12) United States Patent
Grassi et al.

(10) Patent No.: US 10,480,858 B2
(45) Date of Patent: Nov. 19, 2019

(54) HYDRAULIC-BINDER ROTARY-FURNACE OPERATION

(71) Applicant: L'Air Liquide, Societe Anonyme pour l'Etude et l'Exploitation des Procedes Georges Claude, Paris (FR)

(72) Inventors: Alex Grassi, Milan (IT); Dirk Hoelscher, Dusseldorf (DE); Bertrand Leroux, Breuillet (FR); Jacques Mulon, Massy (FR); Xavier Paubel, Montigny le Bretonneux (FR); Remi Tsiava, Saint Germain-les-Corbeil (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/122,009

(22) PCT Filed: Feb. 26, 2015

(86) PCT No.: PCT/EP2015/053985
§ 371 (c)(1),
(2) Date: Aug. 26, 2016

(87) PCT Pub. No.: WO2015/128400
PCT Pub. Date: Sep. 3, 2015

(65) Prior Publication Data
US 2017/0016670 A1 Jan. 19, 2017

(30) Foreign Application Priority Data
Feb. 28, 2014 (EP) ..................................... 14305296

(51) Int. Cl.
*F27B 7/36* (2006.01)
*C04B 7/44* (2006.01)
(Continued)

(52) U.S. Cl.
CPC .............. *F27B 7/36* (2013.01); *C04B 7/4438* (2013.01); *F27B 7/10* (2013.01); *F27B 2007/005* (2013.01)

(58) Field of Classification Search
CPC ........ F27B 7/10; F27B 7/36; F27B 2007/005; C04B 7/4438
(Continued)

(56) References Cited

U.S. PATENT DOCUMENTS 2,301,855 A 11/1942 Cliffe
3,133,812 A * 5/1964 Moklebust .............. C21B 13/08
266/160
(Continued)

FOREIGN PATENT DOCUMENTS

DE 14 83 052 8/1971
DE 23 49 529 4/1975
(Continued)

OTHER PUBLICATIONS

International Search Report and Written Opinion for PCT/EP2015/053985, dated Jun. 16, 2015.

*Primary Examiner* — Steven B McAllister
*Assistant Examiner* — Benjamin W Johnson
(74) *Attorney, Agent, or Firm* — Christopher J. Cronin (57) ABSTRACT

Method of operating a rotary furnace for the production of hydraulic binder so as to reduce ring formation therein, whereby the longitudinal temperature profile in the furnace is varied during furnace operation by injecting at least one fluid other than the main fuel(s), the primary oxidizer and hot air from the material cooler with at least one continuously or discontinuously varying injection parameter.

12 Claims, 6 Drawing Sheets

(51) Int. Cl.
*F27B 7/10* (2006.01)
*F27B 7/00* (2006.01)

(58) Field of Classification Search
USPC .................. 432/1, 13, 14, 17, 18, 19, 24
See application file for complete search history.

(56) References Cited

U.S. PATENT DOCUMENTS

| | | | |
|---|---|---|---|
| 3,220,714 A | | 11/1965 | Spence |
| 4,266,967 A | * | 5/1981 | Yamada .................. C21B 13/08 |
| | | | 266/113 |
| 4,421,563 A | | 12/1983 | Cosar |
| 4,462,793 A | * | 7/1984 | Maeda ...................... F27B 7/34 |
| | | | 266/173 |
| 4,927,357 A | * | 5/1990 | Yap ...................... C03B 5/2353 |
| | | | 431/10 |
| 5,882,190 A | | 3/1999 | Doumet |
| 6,077,072 A | * | 6/2000 | Marin ...................... F27B 7/34 |
| | | | 110/226 |
| 2011/0287375 A1 | * | 11/2011 | Peterman ................ F27D 19/00 |
| | | | 432/36 |
| 2013/0307202 A1 | * | 11/2013 | Hegenberg ................ F27B 3/28 |
| | | | 266/44 |

FOREIGN PATENT DOCUMENTS

| | | | |
|---|---|---|---|
| DE | 10 2008 029512 | | 1/2010 |
| FR | 2 246 510 | | 5/1975 |
| FR | 2 837 916 | | 10/2003 |
| FR | 2 837 918 | | 10/2003 |
| GB | 634190 | * | 3/1950 |
| GB | 1001161 | * | 8/1965 |
| GB | 1 449 414 | | 9/1976 |
| GB | 2 104 636 | | 3/1983 |

* cited by examiner

HYDRAULIC-BINDER ROTARY-FURNACE OPERATION

CROSS-REFERENCE TO RELATED APPLICATIONS

This application is a § 371 of International PCT Application PCT/EP2015/053985, filed Feb. 26, 2015, which claims § 119(a) foreign priority to EP patent application EP14305296.7, filed Feb. 28, 2014.

BACKGROUND

Field of the Invention

The present invention relates to rotary furnaces for the production of hydraulic binders such as cement and lime.

Related Art

Such rotary furnaces have a generally substantially cylindrical shape, the length of the cylinder being much greater than its width. The furnace rotates around a rotation axis which is inclined with respect to the horizontal and corresponds to the longitudinal axis of the cylinder. The material to be pyroprocessed in the furnace travels downwards through the furnace under the effect of gravity. The furnace comprises a burner assembly at its lower end for the combustion of main fuel with combustion oxidizer so as to generate the heat necessary for pyroprocessing. The flame generated by the burner assembly is directed substantially along the longitudinal direction of the furnace. The flue gases generated in the furnace are evacuated from the furnace at its upper end.

The pyroprocessed material, such as lime or clinker, is transferred from the furnace to an air-cooled material cooler.

In order to reutilize the thermal energy of the hot cooling air leaving the cooler, it is known to use the hot cooling air as a secondary oxidizer for the combustion of the main fuel. In that case, the burner assembly injects the main fuel and primary combustion oxidizer into the furnace so as to generate partial combustion of the main fuel with the primary combustion oxidizer. Hot air from the material cooler is fed to the furnace to provide secondary combustion oxidizer for the substantially complete combustion of said main fuel.

It is a problem with rotary furnaces for the production of hydraulic binders that thick localized deposits or build-ups, also referred to as rings, form on the cylindrical wall of the furnace during furnace operation.

Such deposits (which typically comprise non-pyroprocessed and/or partially or completely pyroprocessed material, ash and dust) can drastically limit the production capacity of the furnace and disable its stable operation.

Indeed, such deposits reduce the free internal cross area/diameter of the rotary furnace, which firstly creates a bottleneck for the material flow and also results in pressure drop increase over the length of the furnace. As a consequence of this pressure drop increase, when the fan, known as exhaust fan, supplying the secondary combustion oxidizer to the furnace via a downstream pyroprocessed material cooler, is operated at constant power, the amount of combustion oxidizer supplied to the furnace decreases, causing a decrease in the heat produced in the furnace and a corresponding decrease in pyroprocessed material production. If, alternatively, the power to the fan, which may be an Induced Draft or ID fan, is increased in order to overcome the increase in pressure drop and to maintain the level of combustion oxidizer supplied to the furnace, the energy efficiency of the production process is significantly reduced thereby.

Various methods have been proposed to limit ring formation and to remove those rings that have formed during furnace operation.

When ring formation is due to the recirculation in the kiln of a furnace atmosphere containing a large amount of impurities, such as sulfur or chlorine, a known basic solution is the use of a by-pass installation to extract part of the flue gases or of the furnace atmosphere, typically from 1 to 5%. This solution reduces global efficiency of the plant because heat from the flue gas and material present in the flue gas is lost with flue gas extraction. Moreover this solution is very complex to design and implies considerable additional capital cost.

Another curative solution consists in shooting out the ring by an industrial gun firing through the kiln hood, if the ring is not formed too far back from the kiln outlet. An alternative solution to mechanically break-up such deposits is to fire $CO_2$ charges through the shell of the kiln at locations where ring formation occurs, provided ports are available thereto (see U.S. Pat. No. 2,301,855). U.S. Pat. No. 3,220,714 describes a further process for mechanically removing a material ring from a rotary kiln by cyclically applying vibratory mechanical energy to cause cracks in the ring and thereby to reduce the structural rigidity of ring. These known mechanical solutions can severely damage the (refractory material of the) kiln wall.

However, they do not reduce the process of ring formation in the furnace and require the furnace to be shut down and cooled before the rings can be removed.

In accordance with the process described in U.S. Pat. No. 4,421,563, solid fuel is first gasified, sulfur is removed from the produced gas and the cleaned gas is combusted in the rotary furnace. Such a process is capable of reducing those mechanisms of ring formation connected to the presence of ash and other combustion residues in the furnace. However, such a process is normally not of industrial interest as it increases the production costs of the hydraulic binder to inacceptable levels. Indeed, the reason why low quality fuels and other waste products are frequently burnt in the rotary furnace is exactly to keep production costs at a competitive low level.

In U.S. Pat. No. 5,882,190 a method of clinker production by burning high sulfur containing fuel is proposed whereby the sulfur content of the clinker is measured and whereby the oxygen content in the furnace flue gas is maintained sufficiently high so as to keep the temperature in the kiln below the decomposition temperature of $CaSO_4$. The oxygen content in the flue gas is controlled by adjusting the speed of the exhauster (exhaust fan) sucking air trough kiln and tower and the plant. This solution is limited by the exhaust fan capacity and only addresses the problem of ring formation linked to excessive sulfur.

In FR-A-2246510, it is proposed to inject additional air at the inlet end (flue gas outlet) of a clinker kiln so as to lower the temperature of the atmosphere at the kiln inlet to a temperature lower than the temperature defining ring formation. This proposed solution drastically reduces the thermal efficiency of furnace and deals only with ring formation at the kiln inlet.

FR-A-2837916 proposes to change the flame length and the hot spot location by means of varying the oxidizer flow partition between two branched-off oxidizer injectors of a burner. Also described is an automatic flame-length control as a function of process needs such as the need to limit blockages. Associated with this method is a burner device consisting essentially of three concentric tubes with a fuel channel located between two oxidizer channels.

The practical implementation of the method as described in FR-A-2837918 is not suitable for pyro-processing in a rotary kiln as described above. Indeed, it is practically not possible to use the burner device described in FR-A-2837916 to use hot air from the material cooler, which typically has a temperature around 1100° C., to inject primary oxidizer and secondary oxidizer into the rotary kiln by branching off the secondary oxidizer from a common primary and secondary oxidizer supply line, as is the case according to FR-A-2837918, and to substantially vary the flow ratio between the two, which requires a suitable mechanical control device such as a valve and would entail a significant additional pressure drop which would have to be overcome by the exhaust fan, thereby reducing the profitability of the process.

For this reason, it is standard practice not to use hot cooling air for the primary oxidizer, but to supply the primary oxidizer injected through the burner assembly from a different oxidizer source. Using a common cold air source to generate the primary and secondary oxidizer by branching off is also not an option as this would represent a huge and unacceptable efficiency loss as typically about 20% of the total heat input into the rotary furnace is provided by the hot air from the material cooler.

SUMMARY OF THE INVENTION

It is an aim of the present invention to improve furnace operation by limiting the degree (thickness and/or speed) of ring formation during furnace operation. It is a further aim of the present invention, to improve furnace operation by destabilizing rings formed during the operation of the furnace.

Thereto, the present invention proposes a method of operating a rotary furnace as part of a process for the production of a hydraulic binder. As described above, the furnace has a substantially cylindrical shape with a longitudinal axis which is inclined with respect to the horizontal and around which the furnace rotates. The furnace has an upper end, a lower end and a substantially cylindrical wall. In order to achieve the desired degree of pyroprocessing of the material, the furnace has a length which is substantially greater than its width. The length of the furnace is typically at least 9 times the diameter of the furnace, and preferably from 9 to 40 times the diameter of the furnace.

The material to be pyroprocessed is fed to the furnace at its upper end, travels downwards through the furnace under the effect of gravity and of the rotation of the furnace and leaves the furnace at its lower end as pyroprocessed material.

In the furnace, the material is pyroprocessed by heat generated by combustion of a main fuel. At the lower end of the furnace, the hot pyroprocessed material is transferred from the furnace to an air-cooled material cooler in which the hot pyroprocessed material is cooled by a flow of cooling air, thereby producing cooled pyroprocessed material and hot air.

The furnace comprises a burner assembly at its lower end for injecting the main fuel and a primary combustion oxidizer into the furnace so as to generate partial combustion of the main fuel with said primary combustion oxidizer, so that the combustion products of the main fuel and the primary oxidizer still contain combustible matter. The primary oxidizer is supplemented with hot air from the material cooler which is fed to the furnace at its lower end as secondary oxidizer. In combination, the primary and secondary oxidizer provide substantially complete combustion of the main fuel. The flame generated by combustion of the main fuel with the primary and secondary oxidizer is directed substantially parallel to the longitudinal axis of the furnace. The flue gas is evacuated from the furnace at its upper end.

In accordance with the present invention, the longitudinal temperature profile within the furnace is varied during furnace operation by means of injection of at least one fluid other than the main fuel, the primary oxidizer and the secondary oxidizer into the furnace, said variation of the longitudinal temperature profile being achieved by continuously or discontinuously varying at least one injection parameter of said fluid into the furnace.

In the present context and unless otherwise indicated, the terms "rotary furnace" or, in short "furnace", and "rotary kiln" or, in short "kiln", are synonymous and all refer to a rotary furnace of the type described herein. In the present context, the expression "furnace operation" refers to a process with uninterrupted pyroprocessing in the furnace, i.e. with continuous introduction into the furnace of material to be pyroprocessed and with continuous combustion of the main fuel in the furnace.

Unless otherwise indicated, in the context of the present invention, the term "fuel" refers to the "main fuel".

The "longitudinal temperature profile" within the furnace is reflected in a number of ways. It can notably be determined as the longitudinal temperature profile of the material travelling through the furnace, the longitudinal temperature profile of the cylindrical furnace wall or shell and the longitudinal temperature profile of the gaseous atmosphere inside the furnace. Indeed, the three are intrinsically linked.

The "injection parameters" of the injection of a fluid refer to any injection parameter, the variation of which can lead to a corresponding variation of the longitudinal temperature profile in the furnace. Such injection parameters include: the point of injection, the velocity of injection, the volumetric or mass flow rate of injection, the temperature of injection and the direction of injection.

During "continuous" variation of a parameter, the parameter is varied, i.e. changed, without interruption (incessantly). During "discontinuous" variation, the parameter is varied or changed at certain moments in time, but remains constant at other moments in time. An example of continuous variation is a sinusoidal variation. An example of a discontinuous variation is a stepwise variation.

According to one embodiment of the invention, the fluid is injected with a continuously or discontinuously varying injection velocity so as to vary the longitudinal temperature profile in the furnace.

According to a further embodiment, whereby, in order to vary the longitudinal temperature profile in the furnace, the fluid is injected with a continuously or discontinuously varying injection direction. In that case, for example, the injection direction of the fluid can be varied between at least two of the following injection directions:
   towards the material in the furnace,
   towards the furnace wall and not towards the material,
   substantially according to or parallel to the longitudinal axis of the furnace.

Another possibility is to vary the longitudinal temperature profile in the furnace by injecting the fluid from one or more continuously or discontinuously varying points of injection.

In order to vary the longitudinal temperature profile in the furnace, the fluid can be injected with a continuously or discontinuously varying injection flow rate. For example, it is possible according to the present invention, to inject the fluid intermittently, i.e. to alternate periods with fluid injection into the furnace and periods without fluid injection into the furnace. Alternatively, the fluid can be injected continuously, but with varying (non-zero) flow rates.

A further possibility is to vary the longitudinal temperature profile in the furnace by injecting the fluid with a continuously or discontinuously varying temperature of the fluid.

The parameter variation may be periodic or non-periodic. A "periodic" variation is a variation whereby the parameter changes occur or are repeated at fixed time intervals, but whereby the successive parameter changes may be identical or different. During a "non-periodic" variation, the successive parameter changes do not occur at fixed time intervals, but are, for example, instigated in response to a change in the pyroprocessing process (pressure drop over the furnace, degree of pyroprocessing or quality of the pyroprocessed material, temperature of the cylindrical wall, etc.) detected by a furnace operator or by a control system.

A "cyclic" variation is a variation in the form of recurring successive cycles of the parameter, the parameter changes being identical for each cycle.

It is also possible to combine two or more of the above parameter variations or types of parameter variations in order to vary the longitudinal temperature profile. It is, for example possible to combine a variation of one or more of the fluid injection velocity, the fluid flow rate and the fluid temperature at constant or variable frequencies of injection parameter variation.

Splitting the fluid injection, such as oxygen injection, over two or more injection locations, and varying the fluid injection parameters at the different injection locations can greatly improve the effect of the invention.

One may, for example, vary the injection momentum of the fluid injection at each of said injection locations. It can notably be useful to inject the fluid at injection locations operated at different variable injection momentums.

The fluid can be injected by means of one or more lances located at the lower end of the furnace.

The fluid may in that case be injected into the furnace separately from the burner or through the burner assembly. In particular, the fluid may be injected into the furnace by means of one or more fluid lances installed in through passages of the burner assembly.

The fluid which is injected into the furnace in order to vary the longitudinal temperature profile can be a gas. The fluid advantageously contains a gas selected from the group comprising: oxygen, air, $CO_2$, steam and recycled flue gas, or mixtures thereof, preferably oxygen or oxygen-enriched air.

The fluid can also be a liquid, such as a liquid comprising liquefied oxygen, liquefied air, liquefied $CO_2$, water or mixtures of at least two of said liquids, preferably liquefied oxygen or liquefied oxygen-enriched air. Unless otherwise indicated, the term "oxygen" as used herein, refers to industrial oxygen, i.e. a fluid containing 80% vol to 100% vol $O_2$, preferably at least 90% vol $O_2$ and more preferably at least 95% vol $O_2$.

According to one embodiment of the invention, the fluid which is injected into the furnace is or comprises an auxiliary fuel which is injected into the furnace by means of an auxiliary burner located at the lower end of the furnace. In that case, the longitudinal temperature profile is varied not only by the mere injection of said auxiliary fuel, but also by the combustion of said auxiliary fuel in the furnace and the heat and combustion products generated by said combustion. Typically, but not necessarily, the auxiliary burner also injects an auxiliary combustion oxidizer for burning the auxiliary fuel in the furnace.

When no auxiliary combustion oxidizer is injected into the furnace, the auxiliary fuel burns in the furnace with a remainder of the primary and/or secondary oxidizer not consumed by the combustion of the main fuel.

The auxiliary burner may be separated from or part of the burner assembly. When the auxiliary burner is a separate burner, it may be mounted separately from the burner assembly or in a through passage of the burner assembly.

Particularly suitable auxiliary burners are those capable of varying the fuel injection momentum/the flame momentum. A good example of such a variable flame momentum burner is the burner described in FR-A-2837916.

As already mentioned above, it is possible to vary the injection parameter in response to an observed change in the pyroprocessing process in the rotary furnace detected by a furnace operator or by a control system.

According to one embodiment, the injection parameter is varied in function of the temperature of the cylindrical wall detected at a given location along the length of the rotary furnace. In that case, the injection parameter is advantageously varied when the detected temperature of the cylindrical wall is below a predetermined threshold value indicative of ring formation and/or of a certain thickness of said ring, or when the detected temperature of the cylindrical wall decreases by between 10° C. and 100° C., more probably by between 10° C. and 50° C. in the absence of other changes in the process parameters (type of fuel, type of material to be pyroprocessed, furnace material throughput, etc.) which would give rise to such a temperature change of the cylindrical furnace wall.

Alternatively or in combination with the above, the injection parameter can be varied in function of the pressure drop over the rotary furnace, which, as mentioned earlier, is an indication of (the level of) ring formation in the furnace. In that case, the injection parameter is advantageously varied when the pressure drop over the rotary furnace is higher than a predetermined threshold value.

The hydraulic binder can be cement or lime.

The present invention also relates to the use of any one of the above embodiments of the method according to the invention for reducing local material build-up on the cylindrical furnace wall during furnace operation.

The present invention further relates to the use of any one of the embodiments of the method according to the invention for physically destabilizing local material build-up on the cylindrical furnace wall during furnace operation.

The present invention and its advantages will be better understood in the light of the following example, reference being made to FIGS. 1 to 7, whereby:

DETAILED DESCRIPTION OF THE INVENTION

Although the example relates specifically to a rotary cement furnace, similar considerations apply to other rotary hydraulic-binder furnaces, such as rotary lime furnaces.

The final conversion of meal into cement clinker, which is usually performed in a rotary cement furnace, is a sintering reaction between the principle reactants lime (CaO) and dicalcium silicate (C2S) remaining solids. This solid to solid conversion is greatly enhanced by the presence of 20 to 30% liquid phase formed from the calcium alumina ferrite (C3AF) and tricalcium aluminate (C3A) phases plus the alkalis, sulfates and magnesia.

Co-existence of these various phases along the kiln creates a gradient of material viscosity and stickiness depending on temperature and composition of the material mix and of the atmosphere in contact therewith, causing localized formation of a thick coating, build-up or ring of sticky material on the cylindrical furnace wall.

The current practice of burning alternative fuels, such as shredded tires, organic waste, etc., as (part of) the main fuel in the rotary furnace, thereby introducing a substantial amount of impurities like sulfur and chlorine into the process, tends to promote ring formation and increases the need for a solution to the problem.

Various types and locations of rings are reported in the literature according to their location in the furnace:

Ring at the Lower End of the Rotary Furnace

These rings are mainly associated with overheating of refractory lining and overproduction of the liquid phase of the granular material. To counteract this phenomenon, it is known to select the process parameters at the start of furnace operation, in particular to select a sufficient secondary air flow so as to achieve adequate cooling the furnace wall, to select a sufficiently low secondary air temperature, to position the burner assembly deeper into the furnace or to operate the burner assembly so as to generate a tight flame when said flame tends to lift towards the lining of the furnace.

Ring at the Upper End of the Rotary Furnace

These rings are mainly due to the formation of spurrite/sulfate spurrite, possibly arising from reductive burning conditions at some point in the kiln and recirculation of sulfate.

These rings are particularly problematic as they are located too far back from the lower end of the furnace to be effectively removed by gun firing. It has been proposed to destroy said rings by firing $CO_2$ charges through the cylindrical wall when ports for the firing of such charges are provided. In any case, the kiln has to be stopped frequently and has to be allowed to cool down before the rings can be physically removed. The only known solution not requiring frequent kiln stoppage is to select the process parameters, and in particular the selection of raw meal and the main fuel at the start of furnace operation, so as to prevent a sulfate excess in the hot material. However, this is often not possible due to the need for regional sourcing of raw meal and of the main fuel for cost reasons.

Ring in the Burning Zone in the Middle of the Rotary Furnace

These rings are associated with (re)circulation in the furnace atmosphere of dust particles, in particular fuel ash and material dust such as clinker dust, for example entrained with the secondary combustion air from the cooler. When reaching a sufficiently high temperature in the flame, the dust particles melt and are carried up the kiln where they stiffen again and stick to the furnace wall, forming generally elongated rings. These rings can usually be destroyed mechanically by firing a gun, but this requires significant furnace downtime and can damage refractory lining.

It is also known to try to reduce dust production and/or dust (re)circulation by operating the burner assembly so as to shorten and tighten the flame, however this does not entirely eliminate ring formation in the middle of the rotary furnace, but merely reduces the required frequency of furnace shut-down or the ring length. Indeed shortening the flame requires increasing the flow of primary air and thereby gas recirculation at the burner tip, so that dust from the cooler is carried less far into the furnace, resulting in smaller rings.

In accordance with the present invention, the longitudinal temperature profile within the furnace is varied during furnace operation resulting in a corresponding variation of the longitudinal heat transfer profile and/or material composition profile along the rotary furnace.

During furnace operation, i.e. in the course of continued furnace operation, the longitudinal temperature profile is varied during furnace operation by injecting at least one fluid other than the main fuel, the primary oxidizer and the secondary oxidizer under continuously or discontinuously varying injection parameters. A wide range of fluids can be injected thereto. The fluid can be gaseous or liquid. It can comprise or consist of a further or auxiliary oxidizer, a further or auxiliary fuel, a combination of auxiliary fuel and auxiliary oxidizer, combustion gases generated by the combustion of an auxiliary fuel, steam, $CO_2$, oxygen, recycled combustion gases, etc. In general, due to its promotion of complete fuel combustion, it is preferred to inject oxygen or an oxygen-containing fluid. In accordance with the present invention, at least one injection parameter of said oxygen injection, such as velocity and/or flow rate and/or temperature, is varied to a sufficient degree so as to generate a corresponding variation in the longitudinal temperature profile of the furnace.

In practice, the furnace operator selects the fluid and the injection parameters of the fluid, including, but not only the injection parameter(s) which is (are) varied in accordance with the invention, so as to maximize the impact of the parameter variation on the longitudinal temperature profile of the furnace, but without appreciable negative impact on the furnace output, on the product quality or on the profitability of the process. The selection of the momentum with which the fluid is injected is generally particularly relevant in this respect. The injection momentum of the fluid is advantageously selected at between 5% and 50% of the global momentum of the furnace, preferably between 10% and 30%. This is in particular the case when the fluid is oxygen.

By means of the invention, it is prevented that at a given point along the length of the furnace, the temperature of the material and furnace atmosphere and their composition stabilize or remain at a combination likely to promote ring formation.

Figure 1:
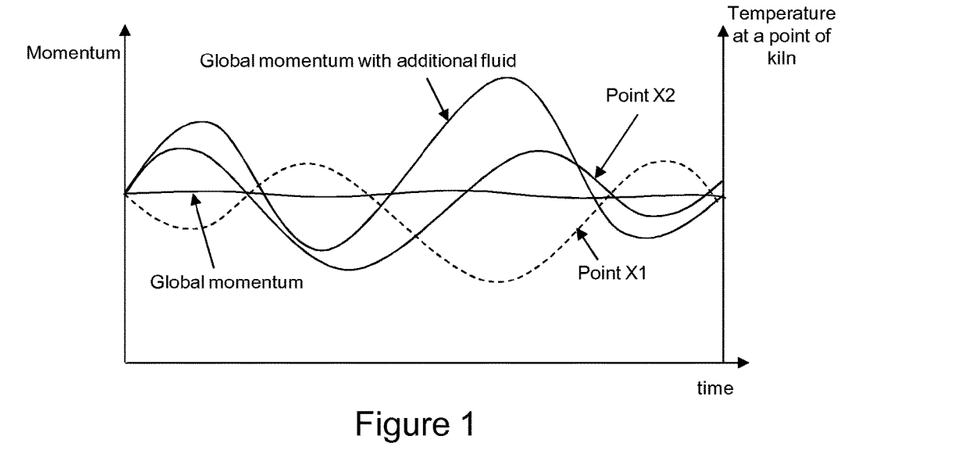
FIG. 1 is a schematic representation of the impact of the variation of the injection momentum of oxygen in accordance with the present invention on the global momentum of the furnace and on the temperature at distinct longitudinal positions within the furnace.

FIG. 1 illustrates the impact over time of a continuous non-periodic and non-cyclic variation of the injection momentum of a fluid jet consisting of oxygen on the temperature of the furnace wall/of the material in the furnace at a given longitudinal position of the furnace.

In this manner, the present invention substantially limits ring growth at specific locations in the rotary furnace by shifting the occurrence of conditions which promote ring growth along the length of the rotary furnace. This is illustrated in FIG. 2.

Figure 2:
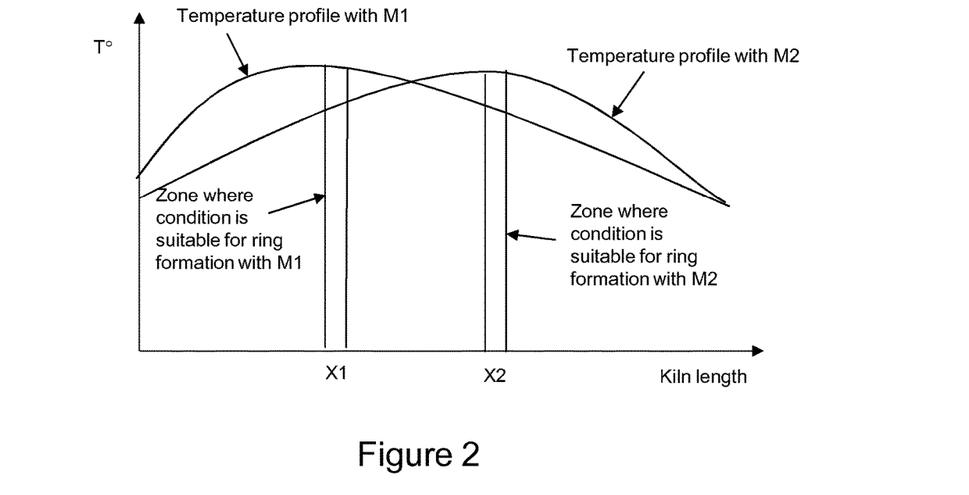
FIG. 2 is a schematic representation of the impact of the variation of the global momentum in the furnace caused by the variation of the injection momentum of oxygen in accordance with the present invention on the longitudinal temperature profile in the furnace and the longitudinal location of ring formation.

As shown in the example of FIG. 2, when the rotary furnace kiln operates with a global momentum M1, the associated longitudinal temperature & composition profile creates a zone at distance X1 from the burner assembly where said conditions promote ring formation.

After a given period of furnace operation, for example after a predetermined number of hours of operation or when probable ring formation is detected (e.g. a decrease in cylindrical wall temperature and/or an increase in the pressure drop over the furnace) the momentum of oxygen injection into the furnace is changed so as to change the global momentum from level M1 to level M2, thereby modifying the material and atmosphere temperature and composition in zone X1 to halt ring growth in said zone and preferably before stabilization of said ring. In this new process operation phase, the conditions suitable for ring formation have now moved to a new location X2 along the rotary furnace. After some further hours of production or, as indicated above, when there are new indications of ring formation within the furnace, the momentum of oxygen injection is again adjusted, for example so as to return to the initial global momentum level M1.

In the latter case, furnace operation alternating between operation at global momentum level M1 and global momentum level M2, the variation of the oxygen injection parameter is discontinuous. When the variations of oxygen injection momentum take place at fixed time intervals, the variation is periodic.

When the changes in the longitudinal temperature profile are sufficiently large, the present invention furthermore makes it possible to destabilize and decrease or destroy rings that have formed in the furnace at a previous stage in the process.

FIG. 1 illustrates the impact over time of a continuous non-periodic and non-cyclic variation of the injection momentum of a fluid jet consisting of oxygen on the temperature of the furnace wall/of the material in the furnace at two distinct longitudinal positions of the furnace. As shown in FIG. 1, the momentum of the oxygen jet was varied sufficiently so as to change the temperature at the two longitudinal positions (and consequently of the longitudinal temperature profile in the furnace).

However, the changes in the oxygen momentum do not generate significant changes in the global furnace momentum. Stable furnace operation and productivity are thus maintained in spite of the changes in the oxygen injection momentum.

Figure 3:
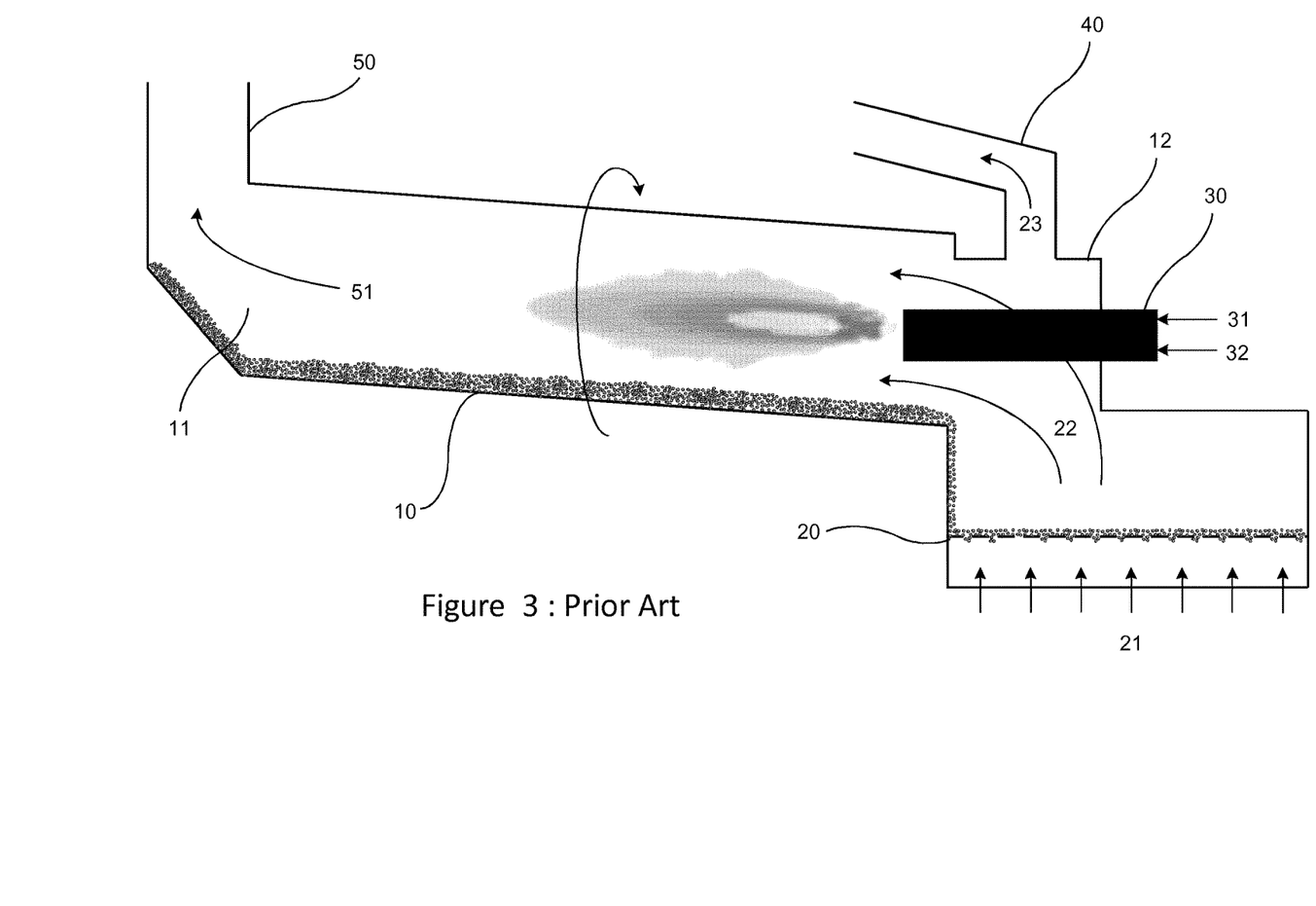
FIG. 3 is a schematic partial representation of a hydraulic-binder production unit according to the state of the art comprising a rotary pyroprocessing furnace.

Rotary furnace or kiln 10 presents an inclined longitudinal axis around which it rotates. Material to be pyroprocessed, such as uncalcined or partially calcined meal is introduced into rotary furnace 10 via kiln inlet 11 located at the upper end of furnace 10. The material travels through rotating furnace 10 under the effect of gravity and cylindrical wall rotation and is pyroprocessed by the heat generated by combustion of the main fuel(s) 31 inside furnace 10. It is indeed common practice to use the cheapest possible appropriate fuel or fuel combination for mineral pyroprocessing in order to keep production costs low.

The fumes or flue gases 51 generated in the furnace are evacuated at the upper end of furnace 10 via exhaust duct 50. When, for example, a precalciner (not illustrated) is present upstream of the rotary furnace (in the flow direction of the material), at least part of the flue gases may be directed towards said precalciner via said exhaust duct 50.

At the lower end of furnace 10, the pyroprocessed mineral material is transferred from furnace 10 to material cooler 20.

In cooler 20, the pyroprocessed material is cooled by means of cooling air 21.

For the combustion of the main fuel(s) 31, a main burner or burner assembly 30 is provided in the kiln hood 12 at the lower end of furnace 10. This main burner 30 is typically designed so as to permit the efficient combustion of a range of fuels, including alternative and low-calorific-value fuels 31.

In addition to the main fuel(s) 31, main burner 30 also injects primary combustion oxidizer 32, typically primary combustion air, into the furnace so as to generate partial burning of the main fuel(s) 31 with the primary oxidizer 32. Combustion of the main fuel(s) 31 is thereafter completed by further combustion with secondary combustion oxidizer 22. Hot air 22 from cooler 20 is used as secondary combustion oxidizer and is injected into furnace 10 at the lower end of furnace 10 separately from main burner 30.

In the illustrated embodiment shown in FIG. 3, a further portion 23 of the hot air from cooler 20 is used as tertiary air and transported from kiln hood 12 to a calciner (not shown) via tertiary air duct 40.

Figure 4:
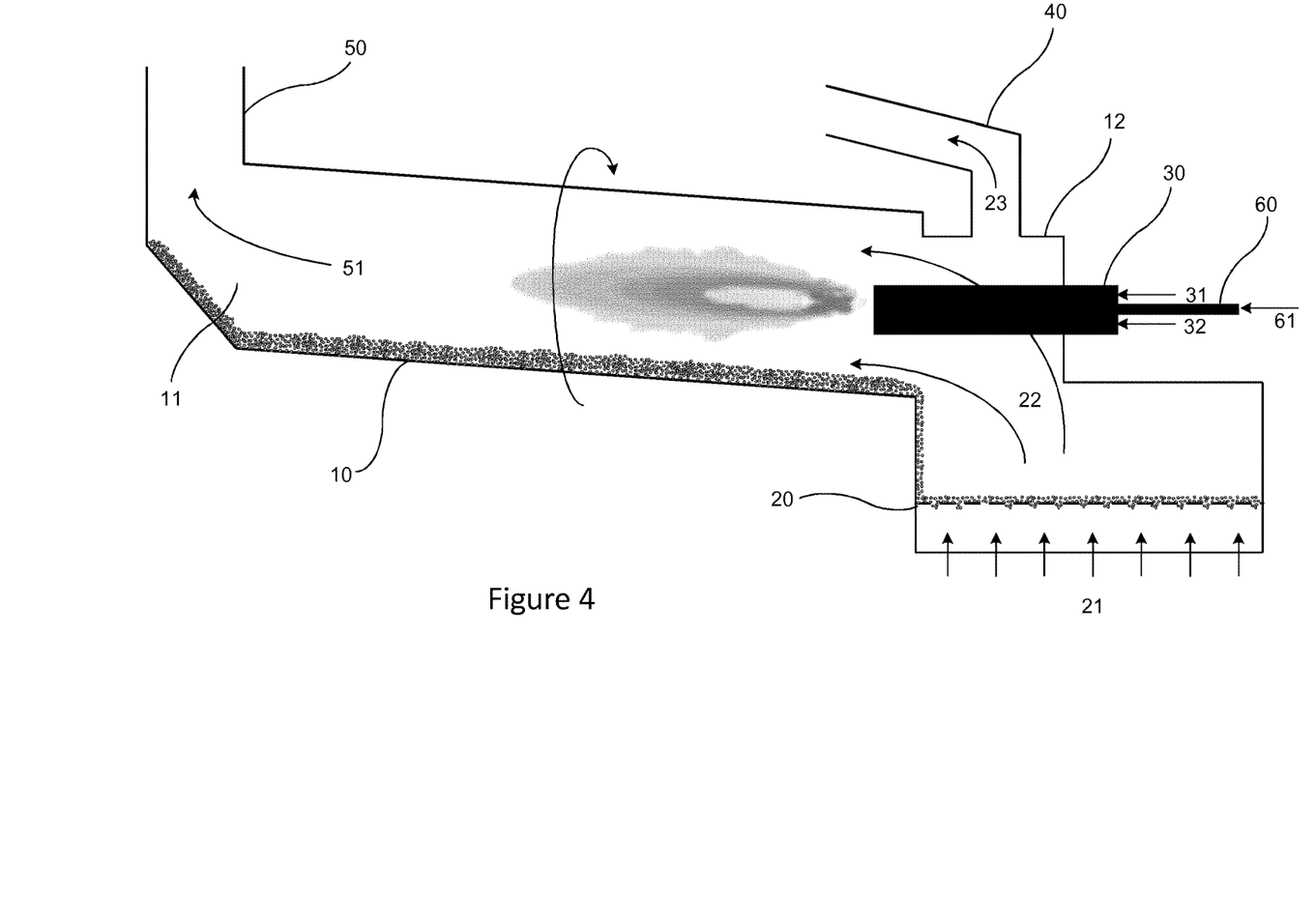
FIG. 4 is a schematic partial representation of a hydraulic-binder production unit of the type illustrated in FIG. 3, but adapted for use in one embodiment of the method of the present invention.
Figure 7:
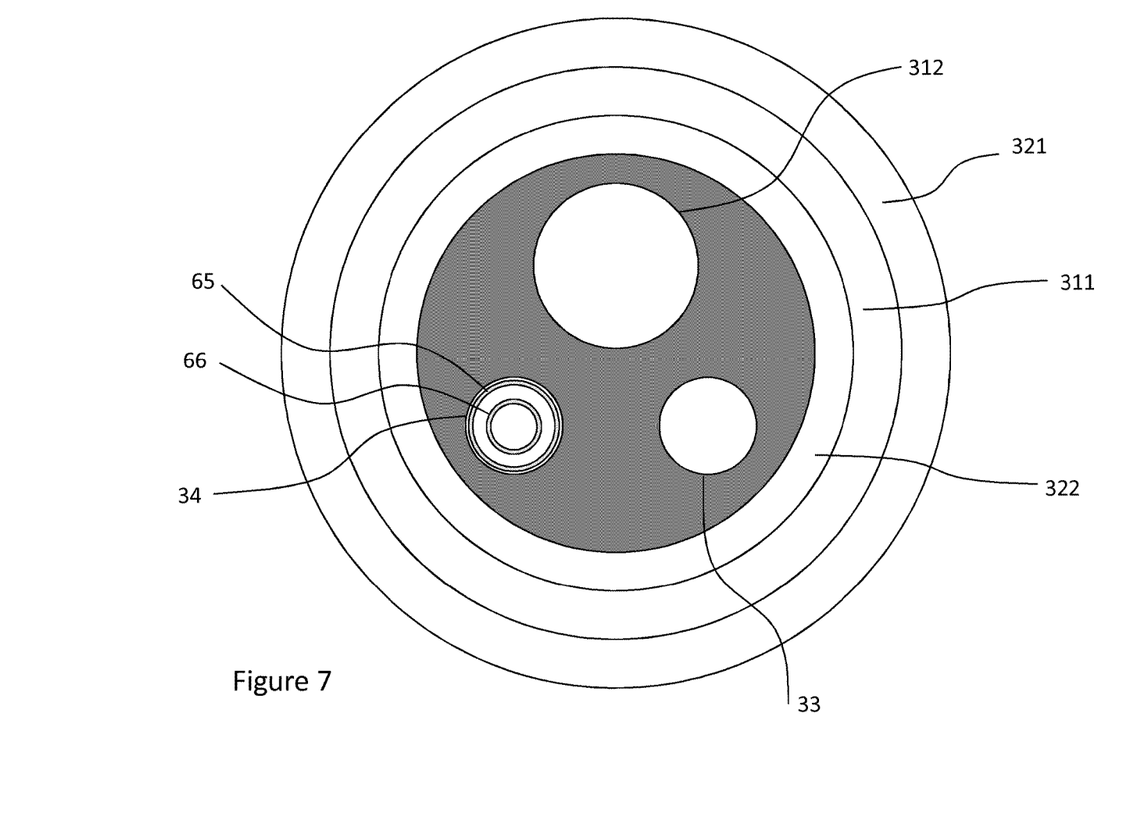
FIG. 7 is a schematic front view of a burner assembly equipped with a suitable lance as illustrated in FIG. 6 and suitable for use in the method according to the present invention, including in the production unit illustrated in FIG. 4.

In the production unit illustrated in FIG. 4, a fluid injection device 60 is installed within burner assembly 30 (for example in channels 33 and/or 34 in FIG. 7).

The burner assembly illustrated in FIG. 7 is adapted for burning two types of main fuel. A first 'primary' main fuel is injected through annual primary-fuel injection passage 311. The primary combustion air is divided in two air flows. A first axial primary-air flow is injected into the furnace via annular axial air passage 321 surrounding primary-fuel injection passage 311. A second radial primary-air flow is injected via annular radial air passage 322 located adjacent and within primary-fuel injection passage 311. The burner assembly further comprises a core element inside air passage 322. Multiple through passages or channels are provided in said core element, and more particularly, primary fuel passage 312 for the injection of primary fuel into the rotary furnace and the above-mentioned two additional channels 33 and 34. The injection parameters of the primary air are fixed in function of the nature and the flow rates of the primary fuel(s).

As many existing rotary kiln burner assemblies already present one or more such spare through passages or channels which, in normal furnace operation, are not used for injecting media into the furnace, the installation of a fluid injection device for use in the method of the invention is often possible without changes to the structure or design of the burner assembly 30 of the furnace 10.

Figure 5:
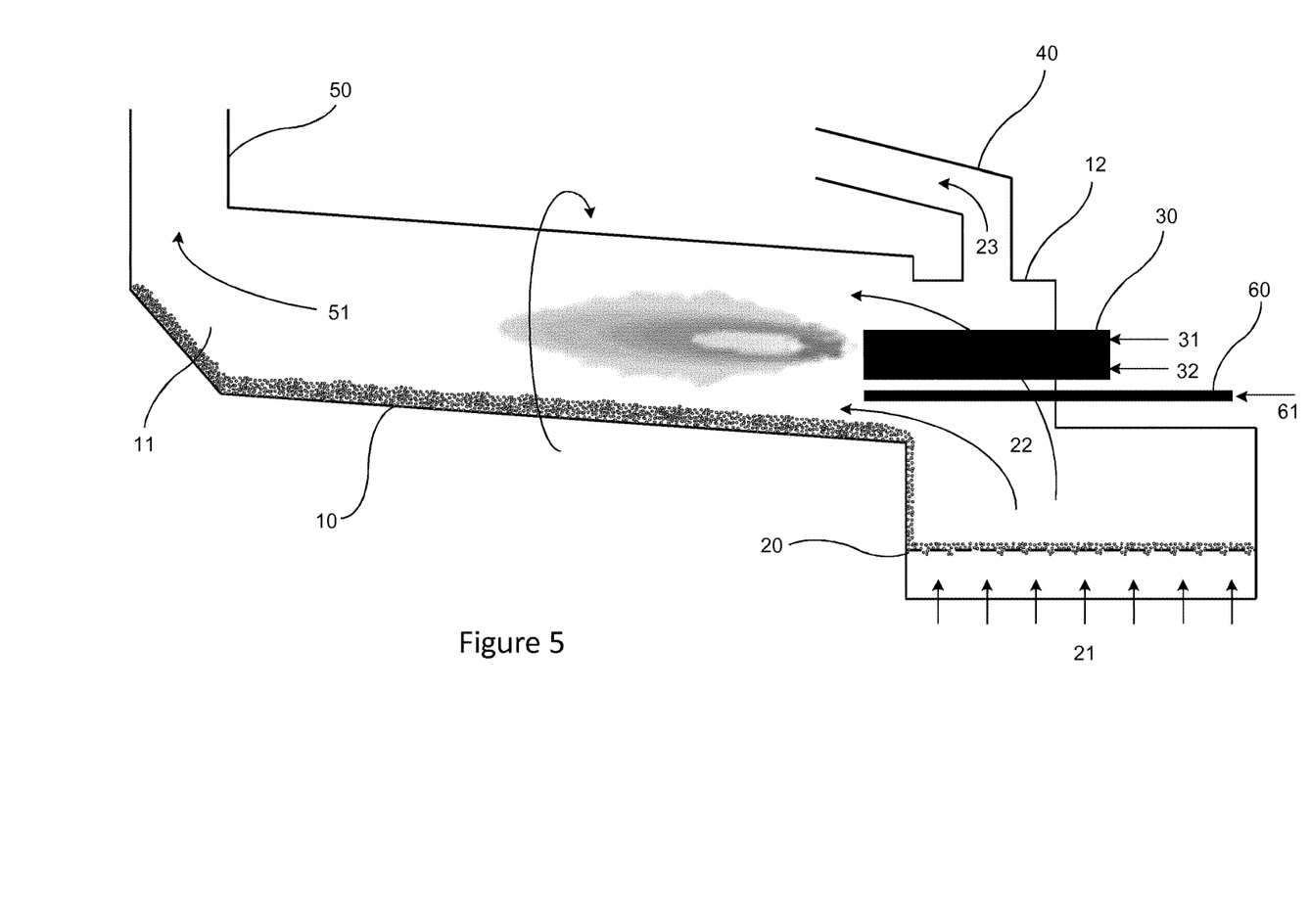
FIG. 5 is a further schematic partial representation of a hydraulic-binder production unit of the type illustrated in FIG. 3, but adapted for use in a second embodiment of the method of the present invention.

In the production unit illustrated in FIG. 5, the fluid injection device 60 is mounted separately from burner assembly 30. Injection device 60 is shown mounted below burner assembly 30, but may also be mounted above or to the side of burner assembly 30, provided this does not interfere with the good functioning of the furnace.

An advantageous choice of additional fluid 61 is oxygen.

In accordance with the present invention, injection device 60 is used to inject a fluid, referred to as additional fluid, other than main fuel(s) 31, primary oxidizer 32 and secondary oxidizer 22, into the furnace. Injection device 60 is more specifically used to inject the additional fluid 61 into the furnace and to vary at least one injection parameter of the additional fluid during furnace operation so as thereby to achieve a change in the longitudinal temperature profile in the furnace while maintaining adequate productivity and pyroprocessed product quality.

One way of implementing the present invention is to vary the injection velocity or momentum of the additional fluid 61, and thereby to vary the longitudinal temperature profile in the furnace.

Figure 6:
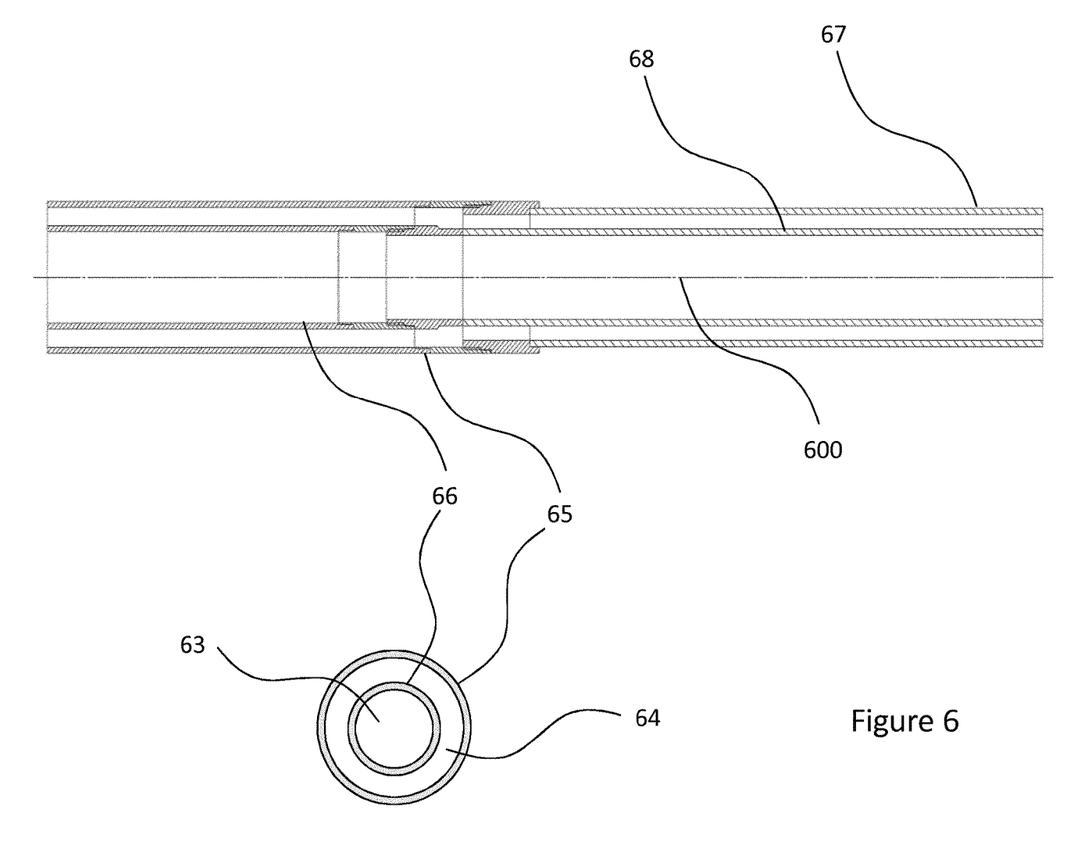
FIG. 6 is a schematic representation in longitudinal cross section and in front view of an oxygen lance suitable for use in the method of the present invention, including in the production units illustrated in FIGS. 4 and 5.

This may be achieved using a lance with two nozzles as injection device 60. Typically, one nozzle will surround the other, for example in a coaxial arrangement. An example of such a lance is illustrated in FIG. 6. The illustrated lance has a longitudinal axis 600, an inner supply pipe 68, which terminates in inner injection nozzle 66 and an outer supply pipe 67 which terminates in outer injection nozzle 65. Inner injection nozzle 66 defines inner injection opening 63 and the space between inner injection nozzle 66 and outer injection nozzle 65 defines outer injection opening 64. Such a lance 60 makes it possible to vary the oxygen injection velocity and injection momentum even at constant oxygen mass flow rates through lance 60, by switching the oxygen injection between (a) oxygen injection substantially through one of injection opening 63 and 64 only and (b) oxygen injection through both the inner and the outer openings 63, 64.

Lance 60 may thus be used for the discontinuous stepwise variation of the oxygen injection velocity or momentum by switching lance operation between a first and second phase during furnace operation. For example, during a first phase the oxygen is fed to both injection openings 63 and 64 to provide a low oxygen injection velocity, whereas during a second phase, inner nozzle 66 is fed with most of the oxygen (for example 90%) to inject a higher velocity or momentum oxygen jet into the furnace. The remaining 10% of the oxygen flow is injected through outer opening 64 to ensure cooling of the outside of the lance and prevent thermal damage thereof. When the flow cross section area of inner injection opening 63 differs substantially from the flow cross section area of outer injection opening 64, further variations in the oxygen injection velocity and momentum can be realized at the same oxygen injection mass flow rate. It is naturally also possible to vary the oxygen injection velocity or momentum by varying the oxygen mass flow rate through the lance and combine a variation of fluid flow rate with a variation of injection velocity.

It is also possible to install two or more distinct additional-fluid injection devices 60 for use in accordance with the present invention. For example, several injection devices 60 may be installed, each with their own point of injection and/or injection direction into the furnace. In that case, the longitudinal temperature profile of the furnace may be varied during furnace operation by varying the additional fluid flow through the different injection devices.

It is also possible to provide several variable-momentum lances as described above, each capable of injecting oxygen at low and high momentum at constant oxygen mass flow rate.

When the furnace is equipped with two such lances, for example one in channel 33 and one in channel 34 of the burner assembly shown in FIG. 7 or two lances at different positions around burner assembly 30 in FIG. 5 or at different locations in the rotary furnace, and to operate, during a first phase, one of said lances to inject oxygen at high momentum, the other to inject oxygen at low momentum, and thereafter to switch to a second phase in which the first of said two lances injects oxygen at low momentum and the second of the two lances injects oxygen at high momentum. By thus switching between the first phase and the second phase during furnace operation, it is again possible to vary the longitudinal temperature profile in the furnace even without varying the mass flow rate of oxygen injected into the furnace as additional fluid.

It is further possible, optionally in combination with one of the above embodiments, to vary the longitudinal temperature profile in the furnace by varying the temperature of the additional fluid injected into the furnace, for example by preheating said fluid to different temperatures by means of heat exchange with the flue gases from the hydraulic binder production plant or with cooling gas from the cooler.

Example

The present invention and its advantages are illustrated in the following non-limiting example of the implementation of the method according to the present invention.

In a prior-art rotary kiln for the production of cement clinker of the type illustrated in FIG. 3, with an internal length of 65 m and equipped with a burner 30 as illustrated in FIG. 7, but without injection lance in either of channels 33 and 34, substantial ring formation took place at a distance between 20 m and 30 m from burner 30, resulting in significant reductions in production capacity. On the outside of the furnace, the formation of said rings within the furnace could be observed in that the shell temperature (i.e. the temperature on the outside of the cylindrical kiln wall) dropped significantly due to the insulating effect of the ring deposits.

In accordance with the present invention, an oxygen lance of the pipe-in-pipe type shown in FIG. 6 was installed in passage 34 in the central core element of burner 30 (as shown in FIG. 7).

A solenoid valve (not shown) at the inlet end of said oxygen lance controlled the distribution of the oxygen injected respectively through inner injection opening 63 and outer injection opening 64.

Using said oxygen lance and the associated solenoid valve, oxygen was injected into the kiln at constant flow rate of 600 $Nm^3/h$, but with cyclic variations of the oxygen injection velocity.

The cyclic variation consisted of two phases.

During the first phase, the solenoid valve was closed and all of the oxygen, except for a minor sweeping fraction, was injected through the inner injection opening 63 at a first injection velocity in the range of 120 m/s to 140 m/s, preferably at 120 m/s. The sweeping oxygen fraction was injected through the outer injection opening 64. Said sweeping oxygen fraction was obtained from the oxygen supply line by bypassing the solenoid valve and was limited to the amount of oxygen required to maintain the outer injection nozzle 65 at a sufficiently low temperature to avoid thermal damage thereof and to prevent particle-laden gases from the kiln atmosphere to travel up said outer nozzle 65 during the first phase.

During the second phase of the cycle, the solenoid valve was open and the oxygen was distributed over and injected through the inner injection opening 63 and the outer injection opening 64, resulting in a lower oxygen injection velocity between 60 m/s and 90 m/s, preferably of 60 m/s.

Switching between the two phases took place every 12 hours.

When the method according to the present invention was used, there was no significant loss of production capacity due to the formation of ring deposits.

In those areas where during prior-art kiln operation ring formation was observed, i.e. at between 20 m and 30 m from the burner, the temperature of the kiln shell was on average 200° C. higher than during prior-art kiln operation.

Compared to prior-art operation, a production increase of appr. 12 tonnes of clinker per tonne of oxygen injected was observed.

This is all the more remarkable as oxygen lancing into the kiln at constant oxygen injection parameters resulted in a significantly lower production increase of 2 to 4 tonnes of clinker per tonne of oxygen injected. The method according to the invention was not only effective in preventing the formation of rings in the rotary kiln. Indeed, when the method according to the invention was used after a period of prior-art operation of the kiln, the method according to the invention permitted the destabilization and destruction of the earlier formed rings.

Although the invention has been described herein with respect to rotary furnaces for the production of hydraulic binders, it will be appreciated that it can be useful for all rotary furnaces in which ring formation during furnace operation presents a problem.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", an and the include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LEGEND

10: rotary kiln/furnace
11: kiln inlet/upper end
12: kiln hood
20: material cooler
21: cold cooling air
22: secondary air/hot cooling air
23: tertiary air
30: main burner assembly
31: main fuel(s)
32: primary air/primary oxidizer
33: channel for fluid injection device
34: channel for fluid injection device
40: tertiary air duct
50: flue gas exhaust duct
51: flue gases
60: fluid injection device/lance
61: additional fluid(s)
63: inner injection opening
64: outer injection opening
65: outer injection nozzle
66: inner injection nozzle
67: outer supply pipe
68: inner supply pipe
311: primary fuel
312: secondary fuel
321: primary air axial flow
322: primary air radial flow
600: longitudinal axis of fluid injection device

What is claimed is:

1. A method of limiting a thickness of rings formed in a rotary furnace for the production of a hydraulic binder and/or limiting speed of rings formed in a rotary furnace for the production of a hydraulic binder, comprising the steps of:

providing a furnace having a substantially cylindrical shape with a longitudinal axis which is inclined, an upper end, a lower end and a substantially cylindrical wall, the length of the furnace being at least 9 times the diameter of the furnace, the furnace comprising a burner assembly at its lower end;

rotating the furnace around the longitudinal axis;

feeding a material to be pyroprocessed to the furnace at its upper end, the material to be pyroprocessed thereby traveling downwards through the furnace under the effect of gravity and being pyroprocessed in the furnace by heat generated by combustion of a main fuel in the furnace and leaving the furnace at its lower end as pyroprocessed hydraulic binder material;

transferring the pyroprocessed material from the furnace to an air-cooled material cooler, to produce cooled pyroprocessed hydraulic binder material and heated air;

injecting the main fuel and primary combustion oxidizer into the furnace with the burner assembly so as to generate partial combustion of the main fuel with the primary combustion oxidizer, feeding the heated air from the material cooler to the furnace at its lower end as secondary oxidizer so as to substantially complete combustion of the main fuel, directing a flame generated by combustion of the main fuel with the primary oxidizer and the secondary oxidizer substantially parallel to the longitudinal axis of the furnace;

evacuating flue gas from the upper end of the furnace; and varying a longitudinal temperature profile within the furnace during furnace operation by injecting, into the furnace, at least one fluid other than the main fuel, the primary oxidizer and the secondary oxidizer, said at least one fluid being selected from the group consisting of oxygen, air, $CO_2$, recycled flue gas, and mixtures thereof, wherein variation of the longitudinal temperature profile is achieved by continuously or discontinuously varying at least one injection parameter of the injection of the at least one fluid other than the main fuel, the primary oxidizer and the secondary oxidizer that is injected into the furnace so as to limit a thickness of rings formed in the rotary furnace and/or a speed of ring formation in the rotary furnace.

2. The method of claim 1, wherein the at least one fluid other than the main fuel, the primary oxidizer and the secondary oxidizer is injected with a continuously or discontinuously varying injection velocity.

3. The method of claim 1, wherein said at least one injection parameter is an injection direction of the at least one fluid other than the main fuel, the primary oxidizer and the secondary oxidizer.

4. The method of claim 3, wherein:

there are several injection devices for injection of the at least one fluid other than the main fuel, the primary oxidizer and the secondary oxidizer each with its own point of injection or injection direction into the furnace; and the particular injector from which injection of the at least one fluid other than the main fuel, the primary oxidizer and the secondary oxidizer is injected into the furnace is continuously or discontinuously varied.

5. The method of claim 1, wherein the at least one fluid other than the main fuel, the primary oxidizer and the secondary oxidizer is injected with a continuously or discontinuously varying injection flow rate.

6. The method of claim 1, wherein a temperature of the at least one fluid other than the main fuel, the primary oxidizer and the secondary oxidizer being injected is continuously or discontinuously varied.

7. The method of claim 1, wherein the at least one fluid other than the main fuel, the primary oxidizer and the secondary oxidizer is injected by one or more lances located at the lower end of the furnace.

8. The method of claim 1, wherein the at least one fluid other than the main fuel, the primary oxidizer and the secondary oxidizer is a gas.

9. The method of claim 1, wherein the at least one fluid other than the main fuel, the primary oxidizer and the secondary oxidizer is a liquid.

10. The method of claim 1, wherein the at least one injection parameter of the at least one fluid other than the main fuel, the primary oxidizer and the secondary oxidizer is varied as a function of a temperature of the cylindrical wall detected at a given location along the length of the rotary furnace.

11. The method of claim 1, wherein the at least one injection parameter of the at least one fluid other than the main fuel, the primary oxidizer and the secondary oxidizer is varied as a function of a pressure drop over the rotary furnace.

12. The method of claim 1, wherein the hydraulic binder is cement or lime.

* * * * *